April 12, 1949.  A. R. LOW ET AL  2,466,903

ELECTRICAL HYGROMETER

Filed April 28, 1944

Inventors.
R. S. Segsworth.
A. R. Low.
by H. S. Dennison
atty.

Patented Apr. 12, 1949

2,466,903

UNITED STATES PATENT OFFICE 2,466,903

ELECTRICAL HYGROMETER

Archibald Keith Low and Robert S. Segsworth, Toronto, Ontario, Canada, assignors to The General Engineering Company (Canada) Limited, Toronto, Ontario, Canada Application April 28, 1944, Serial No. 533,214

2 Claims. (Cl. 201—57)

This invention relates to improvements in means for measuring the moisture content of air or other gases and the principal object of the invention is to provide a measuring device which will be accurate and dependable and which will enable measurements of humidity being obtained instantaneously at any desired distance from the locality from where the measurement is taken.

A further object of the invention is to provide a device in which the members sensitive to moisture may be placed in various positions throughout a plant and wired to a central electrical energizing and registering member from which readings in the different localities may be taken.

The principal feature of the invention consists in arranging and supporting a thin broad filament of electrical non-conducting material, capable of absorbing and releasing moisture with substantially equal readiness, in a position exposed to convection or other currents and electrically connecting same in an electrical circuit with means for impressing a known voltage thereon and means for measuring the resistance to such voltage.

In the accompanying drawing

Figure 1:
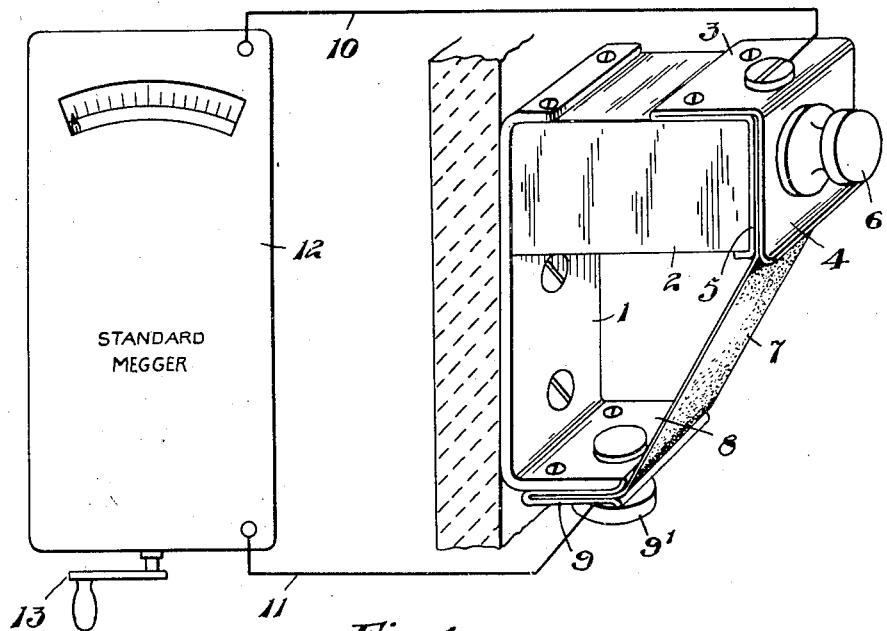
Figure 1 is a perspective view of a simple form of device constructed in accordance with this invention for supporting the humidity sensitive filament in a suitable position, a standard form of "Megger" being shown in plan electrically attached thereto.

The invention comprises primarily the arrangement of a thin broad flat filament of non-conducting material in such a manner as to present the maximum availability to moisture absorption and dissipation from or to surrounding atmospheres and as illustrated in the accompanying drawing a bracket 1 of thin flat material has secured to its upper end and extending angularly therefrom a block 2 of suitable insulating material such as "Lucite."

On the outer end of the block 2 is mounted a metal clip, here shown as formed of a doubled plate 3 of thin spring metal such as bronze, which has an outer contact lip 4 spaced slightly from the portion 5 secured against the end of the block. A flanged thumb screw 6 extending through the spaced ends of the plate 3 and threaded in the block 2 is adapted to tighten the outer contact lip to engage and grip securely the upper end of the broad flat filament 7.

The filament 7 is preferably formed of a broad thin tape of a felted or finely woven cellulosic material, masking tape having been found to be very satisfactory. This filament may be made of other materials that are non-conducting and have the required faculty of absorbing and dissipating moisture with equal readiness.

The lower end of the bracket 1 is formed with an angular projection 8 of much shorter length than the block 2 and secured to it is a suitable broad spring metal clip 9 of the same width as the plate 3 which is adapted to receive the lower end of the filament 7, a suitable thumb nut 9' being secured in the bracket to securely close the clip to hold the filament.

It is found desirable to coat the surfaces of the ends of the filament with a colloidal graphite to ensure a proper electrical contact with the holding clips.

The bracket 1 is preferably secured in a vertical position, with the block 2 uppermost, upon a wall or other broad flat surface which will cause convection currents in the atmosphere and when so placed it presents the broad flat surface of the filament in position of maximum availability to moisture which the filament thus readily absorbs or gives off in accordance with the relative condition of both.

It will be readily appreciated that by the use of a broad flat filament presenting a large area for the accumulation of moisture a small change in humidity will result in a relatively large change in resistance.

The filament gripping members 3 and 9 are connected by insulated wires 10 and 11 with the terminals of a standard "Megger" 12, the armature of which is operated by a crank 13. One terminal of the "Megger" and one terminal of the filament may be grounded if desired.

The voltage of a standard "Megger" is usually 500 v. and when it is operated the voltage generated is impressed upon the circuit which includes the filament 7. The scale of a "Megger" is approximately logarithmic, as also is the relationship between electrical resistance and humidity, consequently the indicator of the "Megger" will show instanteously the resistance to the flow of current through the filament 7 and therefore indicates the degree of humidity of the atmosphere in the vicinity of the filament.

It will be readily understood that the filament supporting members may be placed in any desired number of localities throughout a plant and in various buildings and the wires from these instruments may be connected to a suitable switchboard with which the "Megger" is connected and by simply operating the switch to connect the various instruments with the "Megger" readings of the humidity may be obtained whenever desired.

It will also be understood that the "Megger" scale may be readily calibrated by the use of a known resistance immune to moisture and may be checked against a standard sling hygrometer.

Figure 2:
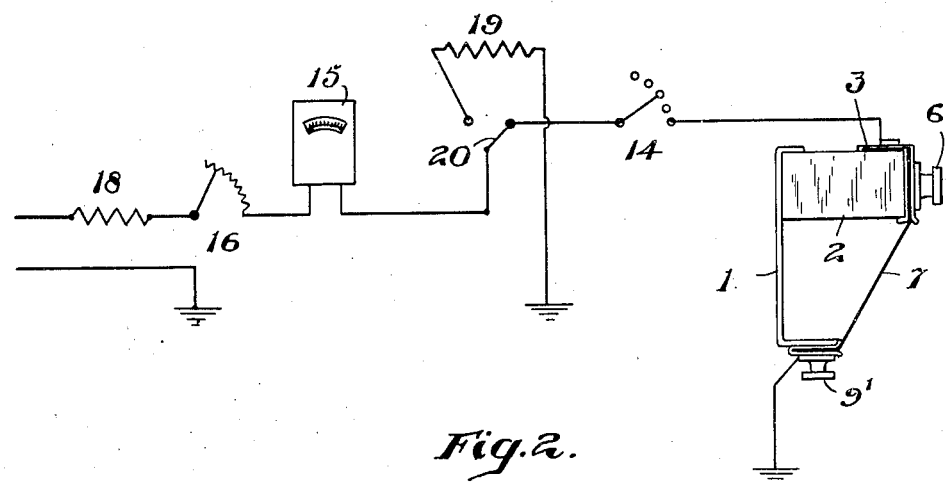
Figure 2 is a diagrammatic view of an arrangement of the invention having a microammeter as an indicating instrument.

In the diagram illustration Figure 2, the upper end of the filament 7 is shown connected with a selector switch 14 to a microammeter 15, and an adjustable resistance 16 is interposed between the microammeter and the source of power to maintain calibration.

A protective resistance 18 is shown between the source of power and the adjustable resistance as a safety measure against an accidental short circuit.

With this arrangement is also shown a standard resistor 19 for checking calibration which may be cut into the circuit by a suitable switch 20.

A device such as described has been found to record accurately humidity in widely different areas and conditions and it is found to be stable and dependable and not dependent upon delicate and highly sensitive elements liable to be rendered inoperative through variable local conditions.

What we claim as our invention is:

1. An electrical hygrometer resistance unit comprising a bracket to be secured to a supporting surface such as a wall or the like, a pair of contacts electrically insulated one from the other supported by said bracket in relative angular relation, a thin broad strip of electrically non-conducting cellulosic material capable of absorbing and releasing moisture with substantially equal readiness extending between said angularly arranged contacts and obliquely of said supporting surface to present a broad expanse to convection currents moving along said supporting surface, and means releasably clamping the ends of said filament to said contacts.

2. An electrical hygrometer resistance unit comprising a bracket adapted to be secured to a broad supporting surface, a clamp of electrically conducting material carried by said bracket, an insulating block extending laterally from said bracket, a second clamp of electrically conducting material secured to said block and lying in a plane angularly disposed relative the plane of the aforesaid clamp, means for operating said clamps between released and clamped positions, and a broad thin filament of electrically non-conducting material capable of absorbing and releasing moisture with substantially equal readiness extending between said clamps and obliquely of said supporting surface to present a broad expanse to convection currents moving along said supporting surface.

ARCHIBALD REITH LOW.
ROBERT S. SEGSWORTH.

REFERENCES CITED

The following references are of record in the file of this patent:

UNITED STATES PATENTS

| Number | Name | Date |
|---|---|---|
| 858,335 | Evershed | June 25, 1907 |
| 1,048,930 | Beighlee | Dec. 31, 1912 |
| 1,383,233 | Parsons et al. | June 28, 1921 |
| 1,444,771 | Baker | Feb. 13, 1923 |
| 1,460,530 | Brown | July 3, 1923 |
| 1,744,120 | Ives | Jan. 21, 1930 |
| 1,749,826 | Lubach | Mar. 11, 1930 |
| 1,781,153 | Allen | Nov. 11, 1930 |
| 1,858,293 | Darlington | May 17, 1932 |
| 2,047,638 | Kott | July 14, 1936 |
| 2,064,651 | Fiene | Dec. 15, 1936 |
| 2,237,006 | Koller | Apr. 1, 1941 |
| 2,358,406 | Lichtgarn | Sept. 19, 1944 |